United States Patent [19]
Rockenfeller et al.

[11] Patent Number: 5,263,330
[45] Date of Patent: Nov. 23, 1993

[54] DISCRETE CONSTANT PRESSURE SYSTEM FOR STAGING SOLID-VAPOR COMPOUNDS

[75] Inventors: Uwe Rockenfeller; Lance D. Kirol, both of Boulder City, Nev.

[73] Assignee: Rocky Research, Boulder City, Nev.

[21] Appl. No.: 813,283

[22] Filed: Dec. 20, 1991

Related U.S. Application Data

[63] Continuation-in-part of Ser. No. 712,081, Jun. 7, 1991, Pat. No. 5,079,928, which is a continuation of Ser. No. 376,426, Jul. 7, 1989, abandoned, and a continuation of Ser. No. 716,065, Jun. 17, 1991.

[51] Int. Cl.$^5$ .............................................. F25B 15/00
[52] U.S. Cl. ........................................ 62/102; 62/480; 62/112; 62/106; 165/104.12; 252/69
[58] Field of Search ................. 62/102, 106, 480, 478, 62/112, 114, 335, 101; 165/104.12; 252/67, 69

[56] References Cited

U.S. PATENT DOCUMENTS

| | | |
|---|---|---|
| 668,310 | 2/1901 | Howell . |
| 1,887,909 | 11/1932 | Altenkirch . |
| 1,932,492 | 10/1933 | Smith . |
| 2,088,276 | 7/1937 | Nesselmann et al. . |
| 2,242,191 | 5/1941 | Kleen . |
| 2,496,459 | 2/1950 | Kleen . |
| 3,633,373 | 1/1972 | Carbonell . |
| 4,111,002 | 9/1978 | Van Mal et al. . |
| 4,183,227 | 1/1980 | Bouvin et al. . |
| 4,408,468 | 10/1983 | Aiefeld et al. ............... 62/112 |
| 4,410,028 | 10/1983 | Alefeld et al. . |
| 4,523,635 | 6/1985 | Nishizaki et al. . |
| 4,610,148 | 9/1986 | Shelton . |
| 4,694,659 | 9/1987 | Shelton . |
| 4,713,944 | 12/1987 | Januschkowetz . |
| 4,754,805 | 7/1988 | Rothmeyer . |
| 4,765,395 | 8/1988 | Paeye et al. . |
| 4,823,864 | 4/1989 | Rockenfeller . |
| 4,831,829 | 5/1989 | Jones et al. . |
| 4,875,346 | 10/1989 | Jones et al. . |
| 4,881,376 | 11/1989 | Yonezawa et al. ............... 62/480 |
| 4,944,159 | 7/1990 | Crozat . |
| 4,976,117 | 12/1990 | Crozat et al. . |
| 5,025,635 | 6/1991 | Rockenfeller et al. ............ 62/106 |
| 5,046,319 | 9/1991 | Jones ......................... 62/467 |
| 5,057,132 | 10/1991 | Lebrun et al. . |

FOREIGN PATENT DOCUMENTS

| | | |
|---|---|---|
| 2855434 | 6/1980 | Fed. Rep. of Germany . |
| 272868 | 12/1927 | United Kingdom . |
| 2095818 | 10/1982 | United Kingdom . |

*Primary Examiner*—John M. Sollecito
*Attorney, Agent, or Firm*—Jerry R. Seiler

[57] ABSTRACT

An apparatus comprises a plurality of two or more reaction chambers, each having a different compound therein comprising a solid reactant adsorbent and a gaseous reactant adsorbed thereon, each of said compounds having a different gaseous refrigerant vapor pressure, substantially independent of the concentration of the gaseous reactant, and having an ascending order of gaseous reactant vapor pressure wherein the adsorption temperature of a lower vapor pressure compound at adsorption temperature of a lower vapor pressure compound at adsorption pressure is at least 8°°C. higher than the desorption temperature of the next successive higher vapor pressure compound at desorption pressure, means for directing heat transfer fluid to an from said reaction chambers whereby heat from an exothermic adsorption reaction is directed to a reaction chamber for driving an endothermic desorption reaction, and heat exchange means for selectively recovering and/or adsorbing heat from said reaction chambers, refrigerant condenser means comprising a single condenser or two or more condensers, each operating at a different temperature, and refrigerant evaporator means comprising a single evaporator or two or more evaporators, each operating at a different temperature. Other improvements comprise a vapor recuperator and a liquid subcooler.

53 Claims, 4 Drawing Sheets

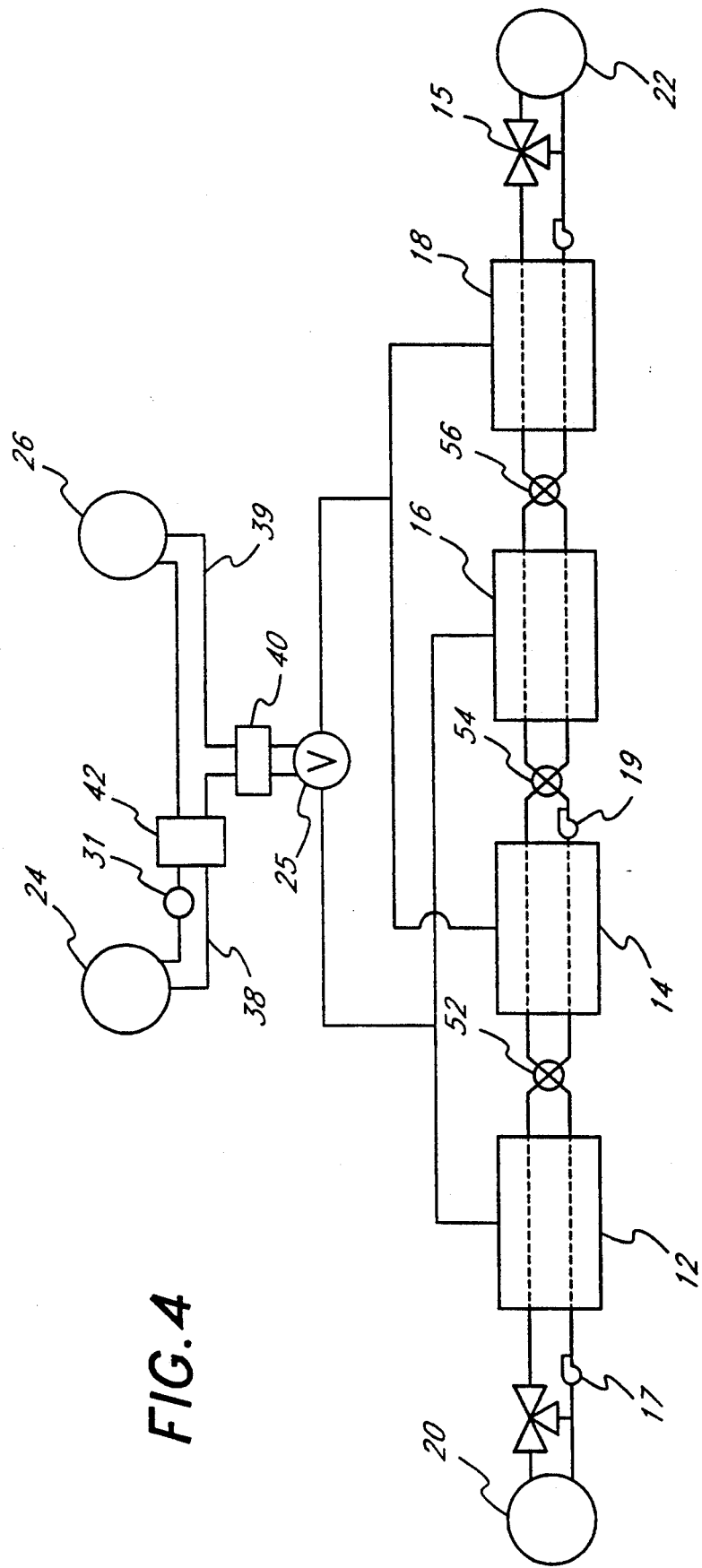

DISCRETE CONSTANT PRESSURE SYSTEM FOR STAGING SOLID-VAPOR COMPOUNDS

This application is a continuation-in-part of copending application Ser. No. 07/712,081 filed Jun. 7, 1991 now U.S. Pat. No. 5,079,928 which is a continuation of Ser. No. 07/376,426, filed Jul. 7, 1989, abandoned, and co-pending application Ser. No. 07/716,065, filed Jun. 17, 1991.

BACKGROUND OF THE INVENTION

In the aforesaid applications there are described apparatus and methods for staging sold-vapor compounds, the descriptions of which are incorporated herein by reference.

The use of compounds comprising solid-vapor compositions formed by adsorption, sometimes referred to as absorption, of gas molecules on a solid adsorbent as heat pump working materials is known in the art. Heat pump systems using such materials have a number of advantages over other heat pumps for residential and commercial space conditioning, industrial heat pumping and refrigeration. Such advantages include higher temperature lift created by the solid-vapor media as compared to other sorption media thus eliminating the need for cooling towers or lift staging. Moreover, the apparatus used for the solid-vapor compound heat pumps require few, if any, moving parts, resulting in simple and reliable hardware. Additionally, such systems do not use the objectionable CFC's.

The solid-vapor compounds suitable for heat pumps include complex compounds which are materials which adsorb molecules of gas to form coordinative bonds in which the gaseous reactant coordinates via electron displacement with the solid adsorbent, commonly a solid metal inorganic salt. The adsorption/desorption process releases significant heat during adsorption and adsorbs energy during the desorption phase. Unlike most other sorption processes, the entire adsorption or desorption reactions may occur at constant temperature, thus eliminating problems with hot and cold sorber ends. Useful gaseous reactants include water, ammonia, methanol and the like. A number of such materials are described in U.S. Pat. Nos. 4,822,391 and 4,848,944. Such compounds and their uses described in the aforesaid patents are incorporated herein by reference.

Heat activated heat pumps consist of a heat engine subsystem which generates high pressure refrigerant vapor, essentially a thermal compressor, and a heat pump subsystem which uses high pressure refrigerant to produce cooling or heat pumping. The thermal compressor, heat pump, and their combination in a heat activated heat pump comprise useful thermodynamic systems which make advantageous use of solid-gas reactions. In the aforesaid applications there are described apparatus and methods using constant pressure staging techniques resulting in improved heat activated heat pump systems. It is an object of the present invention to use such reactions and staging techniques to even greater advantage and efficiency.

SUMMARY OF THE INVENTION

In the present invention, there are provided apparatus improvements used in the heat activated heat pump described in the aforesaid co-pending applications. These improvements include a vapor recuperator and a liquid subcooler, and may be used individually, or in combination. The vapor recuperator is used with a system incorporating a refrigerant condenser and evaporator, or absorber/desorber receivers for gaseous reactant directed to and from the reactors. The liquid subcooler is used only in a refrigerant phase change (condenser/evaporator) system. In another embodiment, multiple-circuits for directing different heat transfer fluids through the reactors are disclosed. In yet another embodiment, preferred reactant media comprise the use of one or more specific complex compounds in different reactors. These preferred complex compounds are disclosed.

BRIEF DESCRIPTION OF THE DRAWINGS

FIG. 4 is a schematic illustration of the same apparatus of the invention incorporating both a vapor recuperator and subcooler.

DETAILED DESCRIPTION

Figure 1:
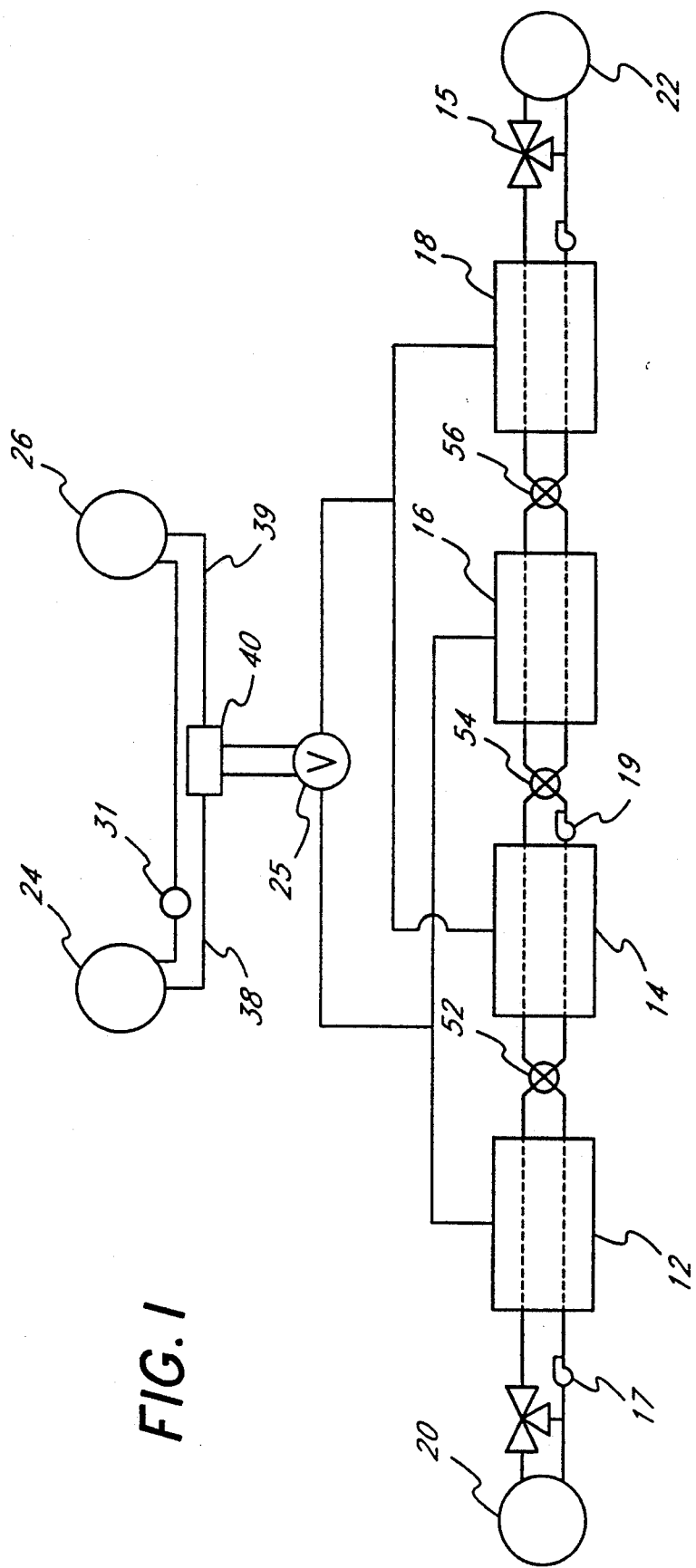
FIGS. 1 and 2 are schematic illustrations of an apparatus of the invention incorporating a vapor recuperator.

As used herein, the term "compound" is intended to mean any reaction product formed by adsorption and desorption of a gaseous reactant, i.e. refrigerant, on a solid reactant within the scope of the invention. In practicing the discrete staging of a constant pressure engine cycle according to the invention, a plurality of two or more different solid reactants are selected, and a different solid reactant is introduced into a different reactor or reaction site in the heat pump apparatus. The different compounds of a set, series or group of compounds used in the process are selected and arranged in ascending order of gaseous reactant vapor pressure such that the temperature of adsorption of the lower vapor pressure compound at low reaction pressure (adsorption), is at least 8° C. higher than the desorption temperature of the next higher vapor pressure compound at high reaction (desorption) pressure. Each of the compounds of such sets or groups each also exhibit different vapor pressure curves, i.e., each has a different vapor pressure-temperature relationship, and which is independent of the concentration of the gaseous reactant. By selecting appropriate compounds and arranging them in the aforesaid sequence, the process cycle will be carried out so that the heat of adsorption is always at an adequate temperature to drive the next or subsequent desorption reaction in the cycle. The compounds of the series are also selected so that none of the compounds in the same reactor have an additional coordination step at lower equilibrium temperature which may adsorb more reactant gas from the other compounds during temperature equilibrium or shut-down condition which would reduce cycle performance during intermittent operation. Moreover, masses of each compound are adjusted so that an approximately equal amount of heat is required to desorb each compound.

Specific reactants used to form compounds useful in the invention include metal oxides, halides, borofluorides, carbonates, nitrites, nitrates, oxalates, sulfides, sulfates and chlorates. Preferred metals for the inorganic salts are selected from alkali and alkaline earth metals, transition metals, aluminum, zinc, cadmium and tin. Preferred transition metals are manganese, iron, nickel, and cobalt. Double metal chloride salts of the aforesaid metals, particularly alkali, alkaline earth, aluminum and the preferred transition metals, are also useful. Hereinafter these reactants will be sometimes referred to as solids, salts or solid reactants. Calcium and strontium halides are especially preferred.

Gaseous reactants which are adsorbed on the solids to form compounds which are especially useful in the processes of the invention are ammonia, water, methylamine and methanol, ammonia being especially suitable because it is stable, and forms high energy complexes. However, sulfur dioxide, other lower alkanols, pyridine, alkylamines, polyamines and phosphine as well as any other polar refrigerant having at least one free electron pair may also be used. Carbon dioxide is also useful with metal oxides. These gaseous reactants are also referred to hereinafter as refrigerants. Particularly preferred ammoniated complex compounds are:

$BaCl_2$. 0–8 ($NH_3$), $CaCl_2$. 4–8 ($NH_3$), $CaCl_2$. 2–4 ($NH_3$), $SrCl_2$. 1–8 ($NH_3$), $LiCl$. 0–3 ($NH_3$), $SrBr_2$. 2–8 ($NH_3$), $CaBr_2$. 2–6 ($NH_3$), $CoCl_2$. 2–6 ($NH_3$), $NiCl_2$. 2–6 ($NH_3$), $FeCl_2$. 2–6 ($NH_3$), $FeBr_2$. 2–6 ($NH_3$), , $CoBr_2$. 2–6 ($NH_3$), $NiBr_2$. 2–6 ($NH_3$), $AlCl_3$. 3–5 ($NH_3$), $CaCl_2$. 0–1($NH_3$), $CaCl_2$. 1–2 ($NH_3$), $CuSO_4$. 2–4($NH_3$), $NaBF_4$. 0.5–2.5 ($NH_3$) and $NaBr$. 0–5.25 ($NH_3$).

Although in the aforesaid complex compounds, numerical value of moles of ammonia per mole of salt is given, in some complexes, the mole range given comprises several coordination steps. Thus, for example, in the case of $NaBF_4$ compounds, a number of different reaction steps occur between the numerical limits given. Typically however, practical considerations only allow for use of a portion of the designed coordination range. Accordingly, the aforesaid ranges are intended to be approximate as will be understood by those skilled in the art.

In a specific example of a set or series of compounds, to illustrate a system according to the invention, salts $FeCl_2$, $SrBr_2$, $SrCl_2$ and $BaCl_2$ are used in a heat pump consisting of four separate reaction vessels or separate heat-transfer regions in one or more reactors. The compounds comprise the ammonia ligand complex compound of the aforesaid salts as set forth hereinabove. FIG. 1 illustrates schematically an example of an apparatus embodiment for carrying out the discrete constant pressure staged heat pump. The salts are charged to reactors 12, 14, 16 and 18, respectively, in successive ascending order of the complex compound ligand vapor pressure. Thus, first reactor 12 is charged with $FeCl_2$, reactor 14 with $SrBr_2$, reactor 16 with $SrCl_2$, and reactor 18 with $BaCl_2$. The apparatus includes a burner 20, heat exchanger 22, evaporator 24 and condenser 26 together with appropriate valves and conduits for directing ammonia gas from and to the reactors and the condenser and evaporator, and valves 52, 54 and 56 for directing heat transfer fluid between the reactors as well as pumps and heat exchange conduits for pumping heat transfer fluid within the system. In the first half-cycle, reactor 12 containing the high temperature salt $FeCl_2$ is at high pressure and reactor 16 containing $SrCl_2$ is also at high pressure. Reactors 14 and 18 are at low pressure, reactor 18 containing $BaCl_2$ and reactor 14 containing $SrCl_2$.

During the first-half cycle, valves 52 and 56 are positioned so that pump 19 circulates heat transfer fluid through reactors 14 and 16, thereby transferring energy released during gas adsorption from reactor 14 to the solid reactant in reactor 16 to drive the desorption reaction occurring there. With the valve settings and proper positioning of valve 15, energy released during the adsorption in reactor 18 is rejected or recovered via heat exchanger 22. In this first half of the heat exchange cycle, valve 25 is also positioned for directing ammonia vapor from reactors 12 and 16 to condenser 26 and from evaporator 24 to reactors 14 and 18. Pump 17 circulates heat transfer fluid from burner 20 to reactor 12 to drive the desorption of the compound in that reactor.

Before start of the second half-cycle of the process, a short phase of heat recuperation and temperature shifting is required. The valve positions are changed so that reactors 12 and 14 are coupled, and reactors 16 and 18 are coupled, respectively, for heat transfer communication. Heat transfer fluid is pumped through each pair of coupled reactors to transfer heat from the hotter to the colder reactor. Thus, reactor 12 is cooled while reactor 14 is heated; reactor 16 is cooled while reactor 18 is heated. This terminates the recuperative and temperature adjustment phase in preparation for the second half-cycle.

In the second half-cycle burner 20 is not used. Solid reactant in reactor 14 desorbs its refrigerant, driven by heat from the adsorption reaction in reactor 12. The compound in reactor 18 desorbs, driven by heat released from adsorption of the compound in reactor 16. Ammonia from the desorption reactions is directed to the condenser 26, and ammonia for the adsorption reactions is obtained from evaporator 24. At the conclusion of the second half-cycle, another phase of recuperation and temperature adjustment as previously described readies the system for repeating the first half-cycle. The apparatus of FIG. 1 could also be modified with reactors 12 and 16 combined and reactors 14 and 18 combined in single vessels, respectively, since both reactors in either pair are always at the same pressure. All four compounds may be located in a single reactor, with the heat pump consisting of two such reactors, each operating at alternately high and low pressure.

In selecting the preferred compounds according to the invention, preferred highest vapor pressure compounds, for use in one or more higher vapor pressure stages are $CaCl_2$. 4–8 ($NH_3$), $CaCl_2$. 2–4 ($NH_3$), and mixtures thereof, $SrCl_2$. 1–8 ($NH_3$), $BaCl_2$. 0–8 ($NH_3$), $LiCl$. 0–3 ($NH_3$), $SrBr_2$. 2–8 ($NH_3$), $CaBr_2$. 2–6, $FeCl_2$. 2–6 ($NH_3$), $CoCl_2$. 2–6 ($NH_3$), $NaBF_4$. 0.5–2.5 ($NH_3$) and $NaBr$. 0–5.25 ($NH_3$). Preferred compounds used in one or more lower vapor pressure stages are $SrCl_2$. 1–8 ($NH_3$), $CaCl_2$. 2–4 ($NH_3$), $LiCl$. 0–3($NH_3$), $SrBr_2$. 2–8 ($NH_3$), $CaBr_2$. 2–6 ($NH_3$), $FeCl_2$. 2–6 ($NH_3$) and $CoCl_2$. 2–6 ($NH_3$), $CoBr_2$. 2–6($NH_3$), $NiCl_2$. 2–6($NH_3$), $CuSO_4$. 2–4($NH_3$), and $CaCl_2$. 0–1($NH_3$) and $CaCl_2$. 1–2($NH_3$) used individually or in combination.

A most preferred grouping of compounds uses $CaCl_2$. 4–8 ($NH_3$), $CaCl_2$ .2–4 ($NH_3$), or a combination thereof, or $SrCl_2$. 1–8 ($NH_3$), in the low temperature stage, i.e., highest vapor pressure compounds, $CaBr_2$. 2–6 ($NH_3$) in an intermediate stage, and $CaCl_2$. 0–1 ($NH_3$), $CaCl_2$. 1–2 ($NH_3$) or mixtures thereof in the high temperature (low pressure) stage.

As described in the aforesaid copending application Ser. No. 712,081, an important feature and advantage of the invention is in staging the adsorption and desorption reactions such that the heat generated by exothermic adsorption reactions is directed to reactors for driving the endothermic desorption reactions. According to the present invention, the different complex compounds present in the different reactors are used in ascending order of gaseous reactant vapor pressure, such that the adsorption temperature a lower vapor pressure compound at adsorption pressure is at least 8° C. higher than the desorption temperature of the next successive higher vapor pressure compound at desorption pressure. Thus, the lines for directing heat transfer fluid between the reactors and in thermal communication with the compounds are such that the fluid is directed successively from the lower vapor pressure compounds to the higher vapor pressure compounds.

The aforesaid specific complex compounds may be used in a heat activated heat pump system incorporating receiving means comprising one or more evaporators and one or more condensers in which the refrigerant goes through a gas/liquid phase change as illustrated in FIG. 1, or used in a system in which the receiving means comprises reactors for adsorbing (absorbing) and desorbing the refrigerant to replace the evaporator and condenser, as disclosed in the aforesaid copending application Ser. No. 712,081 and incorporated herein by reference. Where a single evaporator and single condenser are used, refrigerant is directed to the condenser from all desorbing reactors, and from the evaporator to all adsorbing reactors. Where multiple evaporators or multiple condensers are used, each evaporator will operate at a different temperature, as will each of the condensers. Other receiving means may be used including power generating devices such as a turbine or other expansion means, or a liquid vapor sorption cycle. Additionally, this type of staging system may be used on the heat pump instead of the heat engine side to increase temperature lift for a given pressure ratio, or to decrease pressure ratio for a given lift. When used in this mode, the system may be activated by either a mechanical or thermal compressor. For heat pump staging, as also described in the aforesaid application, the complex compounds are selected and arranged in ascending order of adsorption temperatures at the same adsorption and desorption pressure, respectively, such that the adsorption temperature of the lower adsorption temperature compound at high reaction pressure is at least 8° C. higher than the desorption temperature of the next successive higher adsorption temperature compound at low reaction pressure.

VAPOR RECUPERATOR

According to the invention, an increase in the coefficient of performance (COP) and specific refrigeration capacity is provided by a vapor recuperator, comprising a heat exchanger located along the flow paths of the refrigerant to and from the reactors. As illustrated in FIG. 1, the vapor recuperator 40 is placed conveniently along the conduits 38 and 39 between the reactors and the evaporator 24 and condenser 26, respectively. At such a location, the recuperator 40 provides for heat exchange between the refrigerant vapor streams flowing between the reactors and the condenser, and between the evaporator and the reactors. By incorporating such a recuperator, super-heated vapor flowing from the desorption reactors toward the condenser is cooled against the relatively cool vapor directed from the evaporator to the adsorption reactors. Because energy recuperated from the superheated refrigerant leaving the desorption reaction is transferred to the cold gaseous refrigerant typically leaving the evaporator and then undergoing exothermic adsorption, thermal efficiency of the system is increased. A vapor recuperator may also be advantageously installed between reactors (stages) or, alternatively between the highest pressure reactor and the condenser and evaporator. Refrigerant vapor exiting the next hottest reactor is used to heat vapor entering the next coldest vapor reactor. Combinations of various recuperator placements are also often desirable; for example, between the highest pressure reactor and the condenser/evaporator, and/or between the two lower stage reactors.

Figure 2:
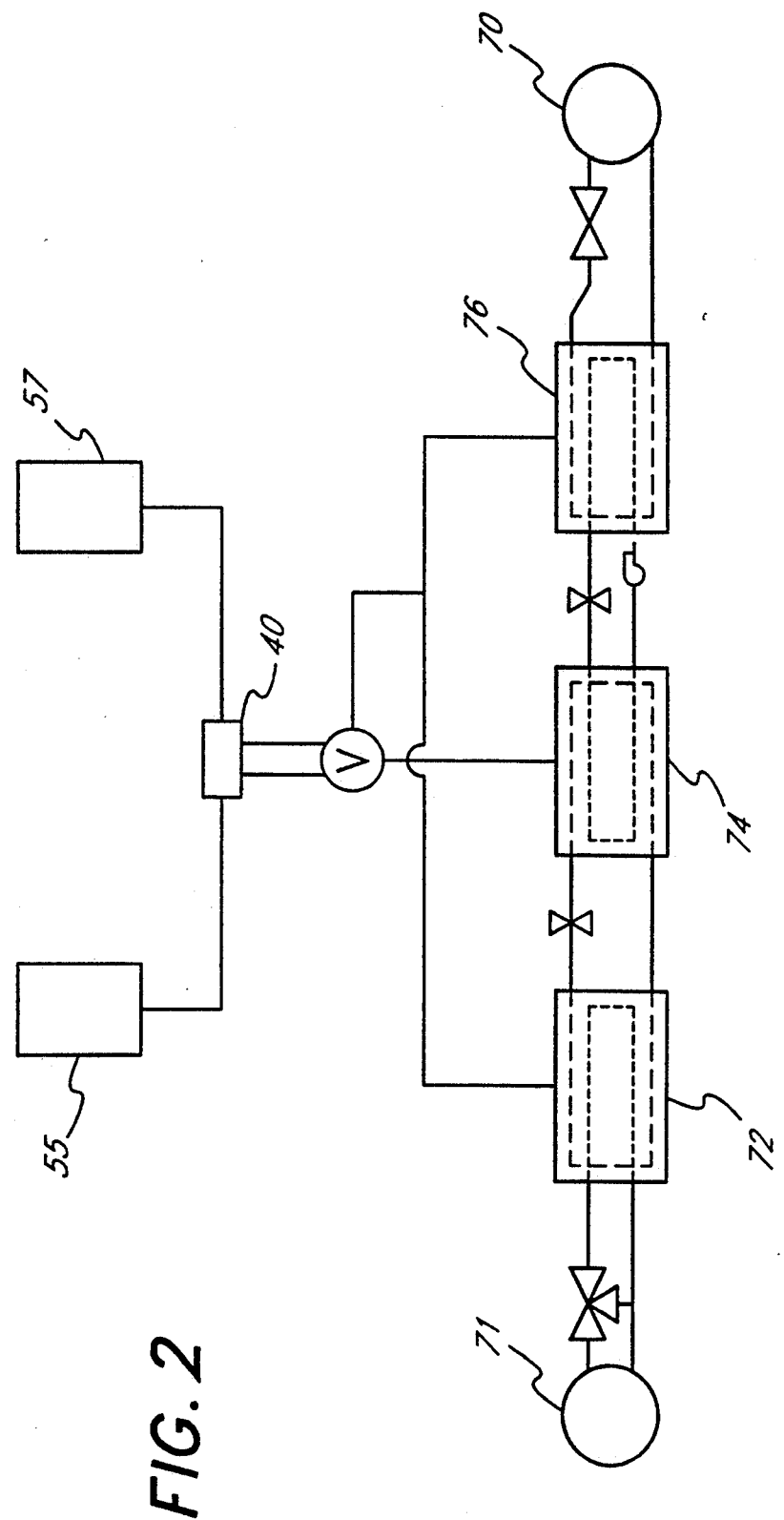

In the embodiment shown in FIG. 2, reactors 55 and 57 are substituted for the evaporator and condenser components used in the refrigerant phase change apparatus of FIG. 1. Such reactors, contain a solid or liquid solutions for alternately adsorbing (absorbing) and desorbing the refrigerant directed thereto from the staging reactors 72, 74 and 76. The reactors 55 and 57 cooperate with heat exchanges (not shown) for recovery of energy from the alternating chemisorption reaction as described in the aforesaid applications and incorporated herein by reference. The vapor recuperator 40 functions the same way in this embodiment as in FIG. 1, to cool super-heated refrigerant vapor directed from a staging desorbing reactor to an adsorbing reactor (55 or 57), against the relatively cool vapor directed from a desorbing reactor (55 or 57) to a staging adsorbing reactor.

LIQUID SUBCOOLER

Figure 3:
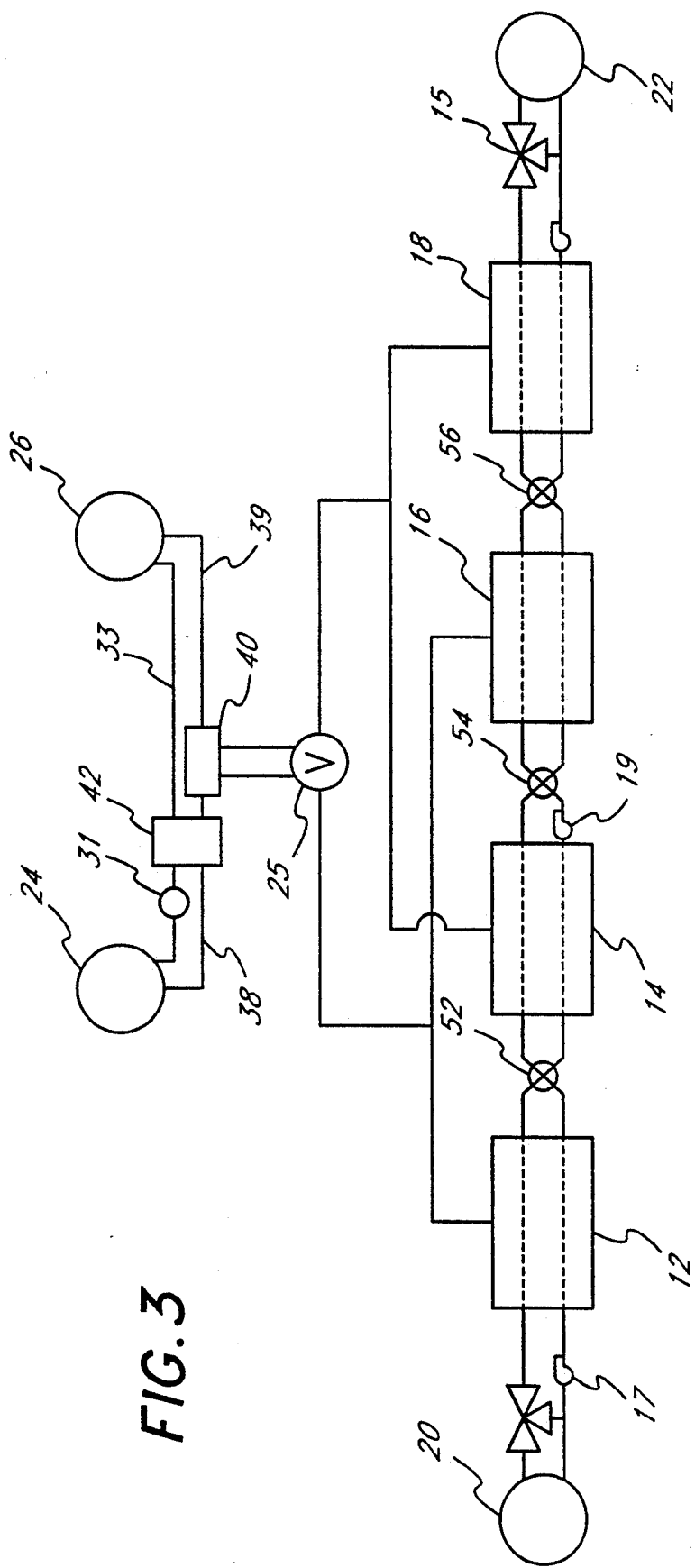
FIG. 3 is a schematic illustration of an apparatus of the invention incorporating a liquid subcooler.

In another embodiment of the invention, a liquid subcooler is used in a refrigerant phase change apparatus incorporating an evaporator and condenser. As illustrated in FIG. 3, a liquid subcooler 42 comprising a liquid-vapor heat exchanger is provided for cooling liquid refrigerant flowing from the condenser to expansion valve 31 via conduit 33 against relatively cold vapor of the exiting the evaporator 24. The liquid subcooler 42 is conveniently located along the conduits 33 between the condenser 26 and evaporator 24 on the condenser side of expansion valve 31, or other gas expansion means, and conduit 38, whereby these fluid streams are in thermal communication to provide for heat transfer therebetween. This heat transfer causes the liquid refrigerant in conduit 33 to become subcooled by the heat exchange against the relatively cold vapor from the evaporator in conduit 38 whereby a smaller fraction of the liquid will flash to vapor in isenthalpic expansion thereby increasing the cooling efficiency and capacity of the system based on the amount of refrigerant fluid directed through the system. A further advantage of the subcooler is increasing the energy provided in the vapor stream from the evaporator to the adsorbing reactor(s) thereby ultimately decreasing the amount of prime energy needed to drive desorption reactions. Accordingly, refrigeration capacity and COP are both increased.

In FIG. 4, an example of an apparatus incorporating both the vapor recuperator 40 and liquid subcooler 42 is illustrated.

FIG. 2 also illustrates an embodiment using multiple-circuits for directing heat transfer fluids to and from the salts in the reactors with the heat transfer fluids passing through the reactors. The use of multiple circuits in the reactors provides for the use of different heat transfer fluids and different phases of those fluids. For example, reactor 72 might be direct fired with flue gas or exhaust from furnace 71 during the desorption phase, and a different fluid or other heat transfer liquid used for rejecting or removing the heat during the adsorption phase. A plurality of different heat transfer fluids may be used in different circuits to maintain high heat transfer coefficients over the temperature of the heat exchange required in the staging of the reactors and compounds. The use of specific and different heat transfer fluids may be tailored to the system, depending on a different combination of salts and the temperature ranges achieved in the reaction phases. The heat transfer fluids may be chosen to take optimum advantage of their respective heat transfer properties when used in such systems. By way of further example, in a three salt system illustrated, the high temperature salt in reactor 72 could be desorbed by being direct fired or heated with a hot fluid from furnace 71, a phase change heat transfer medium such as Dowtherm J ® used to transfer heat from the high temperature reactor 72 to the intermediate temperature reactor 74, during adsorption of the high temperature salt and desorption of the intermediate temperature compounds. Water could be used to transfer energy from the intermediate to the low stage reactor 76, with phase change or pumped heat transfer both being practical, and phase-change ammonia to transfer heat from the low temperature salt in reactor 76 to heat exchanger 70 (heat rejection). Such use of four incompatible fluids requires dual circuits in each reactor. Such multiple circuits may also be used to take advantage of using high temperature exhaust gases from furnace 71 or from outside waste or reject heat sources by directing such heated fluids through the reactors and a different fluid, for example, water or a heat transfer oil for heat rejection. The staged cycles can use two or three different heat transfer fluids and/or phase change heat transfer fluids to maintain good transport properties over all heat exchange temperatures required for the staging. These as well as other advantages within the scope of the invention will be evident to those skilled in the art.

We claim:

1. An apparatus comprising:
a plurality of two or more reaction chambers each of said chambers having a different compound therein comprising a solid reactant adsorbent and a gaseous reactant adsorbed thereon, each of said compounds having a different gaseous reactant vapor pressure, substantially independent of the concentration of the gaseous reactant therein, wherein said gaseous reactant is selected from the group consisting of ammonia, water, carbon dioxide, sulfur dioxide, a lower alkanol, alkylamine, polyamine, phosphine and polar refrigerant having at least one free electron pair, and said solid reactant is an inorganic salt selected from the group consisting of a metal oxide, halide, carbonate, oxalate, nitrate, nitrite, sulfide, and sulfate, wherein said metal is selected from the group consisting of alkali metal, alkaline earth metal, transition metal, aluminum, zinc, cadmium, and tin, or a double metal chloride of metals selected from the group consisting of an alkali metal, alkaline earth metal, aluminum, manganese, iron, nickel and cobalt,
heating means for introducing heat into at least one of said chambers, means for supplying a heat transfer fluid to and from said reaction chambers, and means for directing the heat transfer fluid through said reaction chambers in thermal communication with said compounds therein whereby heat from an exothermic reaction is directed to a reaction chamber for driving an endothermic reaction,
flow directing means for directing relatively heated gaseous reactant from one or more desorbing reaction chambers to receiving means and directing relatively cool gaseous reactant from receiving means to one or more adsorbing reaction chambers, and
a heat exchanger cooperating with said flow directing means for transferring heat between said heated gaseous reactant and said relatively cool gaseous reactant.

2. Apparatus of claim 1 wherein said receiving means comprises one or more condensers for receiving said relatively heated gaseous reactant and one or more evaporators for supplying relatively cool gaseous reactant.

3. Apparatus of claim 1 wherein said receiving means comprises means for adsorbing and desorbing said gaseous reactant.

4. An apparatus of claim 1 wherein said means for directing heat transfer fluid through said reaction chambers comprises multiple channel means capable of directing different heat transfer fluids therethrough in thermal communication with said compounds during adsorption and desorption reactions in said reaction chambers.

5. An apparatus of Claim 1, wherein at least one of said compounds comprises:
$CaCl_2 \cdot 4-8\ (NH_3)$, $CaCl_2 \cdot 2-4\ (NH_3)$ and mixtures thereof, $SrCl_2 \cdot 1-8\ (NH_3)$, $BaCl_2 \cdot 0-8\ (NH_3)$, $LiCl \cdot 0-3\ (NH_3)$, $SrBr_2 \cdot 2-8\ (NH_3)$, $CaBr_2 \cdot 2-6\ (NH_3)$, $CoCl_2 \cdot 2-6\ (NH_3)$, $CoBr_2 \cdot 2-6(NH_3)$, $NiCl_2 \cdot 2-6\ (NH_3)$, $FeCl_2 \cdot 2-6\ (NH_3)$, $CuSO_2 \cdot 2-4(NH_3)$, $NaBF_2 \cdot 0.5-2.5\ (NH_3)$, $NaBr \cdot 0-5.25\ (NH_3)$, and $CaCl_2 \cdot 0-1\ (NH_3)$ or $CaCl_2 \cdot 1-2\ (NH_3)$ and mixtures thereof.

6. An apparatus comprising:
a plurality of two or more reactors each having a different compound therein comprising a solid reactant adsorbent and a gaseous reactant adsorbed thereon, each of said compound having a different gaseous reactant vapor pressure, substantially independent of the concentration of the gaseous reactant therein, wherein said gaseous reactant is selected from the group consisting of ammonia, water, carbon dioxide, sulfur dioxide, a lower alkanol, alkylamine, polyamine, phosphine and polar refrigerant having at least one free electron pair, and said solid reactant is an inorganic salt selected from the group consisting of a metal oxide, halide, carbonate, oxalate, nitrate, nitrite, sulfide, and sulfate, wherein said metal is selected from the group consisting of alkali metal, alkaline earth metal, transition metal, aluminum, zinc, cadmium, and tin, or a double metal chloride of metals selected from the group consisting of an alkali metal, alkaline earth metal, aluminum, manganese, iron, nickel and cobalt;
heating means for introducing heat into at least one of said reactors, means for supplying a heat transfer fluid to and from said reactors, and means for directing the heat transfer fluid through said reactors in thermal communication with said compounds therein whereby heat from an exothermic reaction is directed to a reactor for driving an endothermic reaction;
one or more condensers for condensing gaseous reactant desorbed from said compounds, and first means for directing said gaseous reactant from said reactors to said condenser;

one or more evaporators for said gaseous reactant, and second means for directing said gaseous reactant from said evaporator to said reactors; and a heat exchanger cooperating with said first means and said second means for transferring heat therebetween.

7. An apparatus of claim 6 wherein said means for directing heat transfer fluid through said reaction chambers comprises multiple channel means capable of directing different heat transfer fluids therethrough in thermal communication with said compounds during adsorption and desorption reactions in said reaction chambers.

8. An apparatus comprising:

a plurality of two or more reactors each having a different compound therein comprising a solid reactant adsorbent and a gaseous reactant adsorbed thereon, each of said compounds having a different gaseous reactant vapor pressure, substantially independent of the concentration of the gaseous reactant therein, wherein said gaseous reactant is selected from the group consisting of ammonia, water, carbon dioxide, sulfur dioxide, a lower alkanol, alkylamine, polyamine, phosphine and polar refrigerant having at least one free electron pair and said solid reactant is an inorganic salt selected from the group consisting of a metal oxide, halide, carbonate, oxalate, nitrate, nitrite, sulfide, and sulfate, wherein said metal is selected from the group consisting of alkali metal, alkaline earth metal, transition metal, aluminum, zinc, cadmium, and tin, or a double metal chloride of metals selected from the group consisting of an alkali metal, alkaline earth metal, aluminum, manganese, iron, nickel and cobalt;

heating means for introducing heat into at least one of said reactors, means for supplying a heat transfer fluid to and from said reactors, and means for directing the heat transfer fluid through said reactors in thermal communication with said compounds therein whereby heat from an exothermic reaction is directed to a reactor for driving an endothermic reaction;

one or more condensers for condensing gaseous reactant desorbed from said compounds, and first means for directing said gaseous reactant from said reactors to said condensers;

one or more evaporators for said gaseous reactant, and second means for directing said gaseous reactant from said evaporators to said reactors;

third means for directing condensed gaseous reactant from said condenser to said evaporator; and a heat exchanger cooperating with said second means and said third means for transferring heat therebetween.

9. An apparatus of claim 8, wherein said means for directing heat transfer fluid through said reactors comprises multiple channel means capable of directing different heat transfer fluids therethrough in thermal communication with said compounds during adsorption and desorption reactions in said reactors.

10. Apparatus of claim 8, wherein at least one of said compounds is selected from the group consisting of:

$CaCl_2 \cdot 4-8 \ (NH_3)$, $CaCl_2 \cdot 2-4 \ (NH_3)$ and mixtures thereof, $SrCl_2 \cdot 1-8 \ (NH_3)$, $BaCl_2 \cdot 0-8 \ (NH_3)$, $LiCl \cdot 0-3 \ (NH_3)$, $SrBr_2 \cdot 2-8 \ (NH_3)$, $CaBr_2 \cdot 2-6 \ (NH_3)$, $CoCl_2 \cdot 2-6 \ (NH_3)$, $CoBr_2 \cdot 2-6 (NH_3)$, $NiCl_2 \cdot 2-6 \ (NH_3)$, $FeCl_2 \cdot 2-6 \ (NH_3)$, $CuSO_4 \cdot 2-4 \ (NH_3)$, $NaBF_4 \cdot 0.5-2.5 \ (NH_3)$, $NaBr \cdot 0-5.25(NH_3)$, and $CaCl_2 \cdot 0-1 \ (NH_3)$, $CaCl_2 \cdot 1-2 \ (NH_3)$ and mixtures thereof.

11. An apparatus comprising:

a plurality of two or more reaction chambers each of said chambers having a different compound therein comprising a solid reactant adsorbent and a gaseous reactant adsorbed thereon, each of said compounds having a different gaseous reactant vapor pressure, substantially independent of the concentration of the gaseous reactant therein, wherein said gaseous reactant is selected from the group consisting of ammonia, water, carbon dioxide, sulfur dioxide, a lower alkanol, alkylamine, polyamine, phosphine and polar refrigerant having at last one free electron pair, and said solid reactant is an inorganic salt selected from the group a metal oxide, halide, carbonate, oxalate, nitrate, nitrite, sulfide, and sulfate, wherein said metal is selected from the group consisting of alkali metal, alkaline earth metal, transition metal, aluminum, zinc, cadmium, and tin, or a double metal chloride of metals selected from the group consisting of an alkali metal, alkaline earth metal, aluminum, manganese, iron, nickel and cobalt;

heating means for introducing heat into at least one of said chambers, means for supplying a heat transfer fluid to and from said reactors, and means for directing the heat transfer fluid through said reactors in thermal communication with said compounds therein whereby heat from an exothermic reaction is directed to a reaction chamber for driving an endothermic reaction;

one or more condensers for condensing gaseous reactant desorbed from said compounds, and first means for directing said gaseous reactant from said reactors to said condensers;

one or more evaporators for said gaseous reactant, and second means for directing said gaseous reactant from said evaporators to said reactors;

third means for directing condensed gaseous reactant from said condenser to said evaporator;

a first heat exchanger cooperating with said first means and said second means for transferring heat therebetween; and a second heat exchanger cooperating with said second means and said third means for transferring heat therebetween.

12. An apparatus, comprising:

a plurality of three or more reactors each of said reactors having a different compound therein comprising a solid reactant adsorbent and a gaseous reactant adsorbed thereon, each of said compounds having a different gaseous reactant vapor pressure, substantially independent of the concentration of the gaseous reactant therein, and wherein said gaseous reactant is alternately desorbed from said adsorbent in an endothermic reaction and adsorbed on said adsorbent in an exothermic reaction;

said compounds having an ascending order to gaseous reactant vapor pressure wherein the adsorption temperature of a lower vapor pressure compound at adsorption pressure is at least 8° C. higher than the desorption temperature of the next successive higher vapor pressure compound at desorption pressure;

wherein said gaseous reactant is selected from the group consisting of ammonia, water, carbon dioxide, sulfur dioxide, lower alkanol, alkylamine, polyamine, phosphine and polar refrigerant having at least one free electron pair, and said solid reactant is an inorganic salt selected from the group consisting of a metal oxide, halide, carbonate, oxalate, nitrate, nitrite, sulfide and sulfate, wherein said metal is selected from the group consisting of alkali metal, alkaline earth metal, transition metal, aluminum, zinc, cadmium and tin, or a double metal chloride of metals selected from the group consisting of an alkali metal, alkaline earth metal, aluminum, manganese, iron, nickel and cobalt;

means for introducing heat into at least one of said reactors, means for supplying a heat transfer fluid to and from said reactors, and means for directing the heat transfer fluid through said reactors in thermal communication with said compounds therein, whereby heat from an exothermic reaction is directed to a reactor for driving an endothermic reaction;

means for directing gaseous reactant to and from said reactors;

heat exchange means for heating and/or cooling said heat transfer liquid and for selectively recovering and/or adsorbing heat therefrom; and wherein the highest vapor pressure compound is selected from the group consisting of:
$CaCl_2 . 4-8 (NH_3)$, $CaCl_2 . 2-4 (NH_3)$, mixtures thereof, and $SrCl_2 . 1-8 (NH_3)$, $BaCl_2 . 0-8 (NH_3)$ and $NaBF_4 . 0.5-2.5 (NH_3)$.

13. Apparatus of Claim 12, wherein an intermediate stage vapor pressure compound is $CaBr_2 . 2-6 (NH_3)$.

14. Apparatus of Claim 13, wherein the third lower vapor pressure compound comprises a $CaCl_2 . 0-1 (NH_3)$, $CaCl_2 . 1-2 (NH_3)$ or mixtures thereof.

15. Apparatus of Claim 12, wherein the highest vapor pressure compound is $CaCl_2 . 4-8 (NH_3)$.

16. Apparatus of Claim 12, wherein the highest vapor pressure compound is $CaCl_2 . 2-4 (NH_3)$.

17. Apparatus of Claim 12, wherein the highest vapor pressure compound is a combination of $CaCl_2 . 4-8 (NH_3)$ and $CaCl_2 . 2-4 (NH_3)$.

18. Apparatus of Claim 12, wherein the highest vapor pressure compound comprises $CaCl_2 . 4-8 (NH_3)$, $CaCl_2 . 2-4(NH_3)$ or mixtures thereof.

19. Apparatus of Claim 12, wherein the highest vapor pressure compound is $SrCl_2 . 1-8 (NH_3)$.

20. Apparatus of Claim 15, wherein an intermediate stage vapor pressure compound is $CaBr_2 . 2-6 (NH_3)$.

21. Apparatus of Claim 16, wherein an intermediate stage vapor pressure compound is $CaBr_2 . 2-6 (NH_3)$.

22. Apparatus of Claim 17, wherein an intermediate stage vapor pressure compound is $CaBr_2 . 2-6 (NH_3)$.

23. Apparatus of Claim 18, wherein an intermediate stage vapor pressure compound is $CaBr_2 . 2-6 (NH_3)$.

24. Apparatus of Claim 19, wherein an intermediate stage vapor pressure compound is $CaBr_2 . 2-6 (NH_3)$.

25. Apparatus Claim 12 wherein the lowest vapor pressure compound is $CaCl_2 . 0-1 (NH_3)$, $CaCl_2 . 1-2 (NH_3)$ or mixtures thereof.

26. Apparatus of Claim 15, wherein the lowest vapor pressure compound is $CaCl_2 . 0-1 (NH_3)$, $CaCl_2 . 1-2 (NH_3)$ or mixtures thereof.

27. Apparatus of Claim 16, wherein the lowest vapor pressure compound is $CaCl_2 . 0-1 (NH_3)$, $CaCl_2 . 1-2 (NH_3)$ or mixtures thereof.

28. Apparatus of Claim 17, wherein the lowest vapor pressure compound $CaCl_2 . 0-1 (NH_3)$, $CaCl_2 . 1-2 (NH_3)$ or mixtures thereof.

29. Apparatus of Claim 18, wherein the lowest vapor pressure compound is $CaCl_2 . 0-1 (NH_3)$, $CaCl_2 . 1-2 (NH_3)$ or mixtures thereof.

30. Apparatus of Claim 19, wherein the lowest vapor pressure compound is a combination of $CaCl_2 . 0-1 (NH_3)$, and $CaCl_2 . 1-2 (NH_3)$.

31. Apparatus of Claim 20 wherein the lowest vapor pressure compound is $CaCl_2 . 0-1 (NH_3)$, $CaCl . 1-2 (NH_3)$, or mixtures thereof.

32. Apparatus of Claim 21, wherein the lowest vapor pressure compound is $CaCl_2 . 0-1 (NH_3)$, $CaCl_2 . 1-2 (NH_3)$ or mixtures thereof.

33. Apparatus of Claim 22, wherein the lowest vapor pressure compound is $CaCl_2 . 0-1 (NH_3)$, $CaCl_2 . 1-2 (NH_3)$ or mixtures thereof.

34. Apparatus of Claim 23, wherein the lowest vapor pressure compound is $CaCl_2 . 0-1 (NH_3)$, $CaCl_2 . 1-2 (NH_3)$ or mixtures thereof.

35. Apparatus of Claim 24, wherein the lowest vapor pressure compound is $CaCl_2 . 0-1 (NH_3)$, $CaCl_2 . 1-2 (NH_3)$ or mixtures thereof.

36. Apparatus of Claim 23, wherein the lowest vapor pressure compound is $NiCl_2 . 2-6(NH_3)$.

37. Apparatus of Claim 12, wherein one or more lower stage vapor pressure compounds are selected from the group consisting of:
$SrCl_2 . 1-8 (NH_3)$, $CaCl_2 . 2-4(NH_3)$, $LiCl . 0-3(NH_3)$, $SrBr_2 . 2-8 (NH_3)$, $CaBr_2 . 2-6 (NH_3)$, $FeCl_2 . 2-6 (NH_3)$, $CoCl_2 . 2-6 (NH_3)$, $FeBr_2 . 2-6 (NH_3)$, $NiCl_2 . 2-6 (NH_3)$, $CoBr_2 . 2-6 (NH_3)$, $CuSO_4 . 2-4 (NH_3)$, , $NaBF_4 . 0.5-2.5 (NH_3)$, $NaBr . 0-5.25 (NH_3)$, and $CaCl_2 . 0-1 (NH_3)$, $CaCl_2 . 1-2 (NH_3)$ and mixtures thereof.

38. An apparatus, comprising:
two reactors each having a different compound therein comprising a solid reactant adsorbent and a gaseous reactant adsorbed thereon, each of said compounds having a different gaseous reactant vapor pressure, substantially independent of the concentration of the gaseous reactant therein, and wherein said gaseous reactant is alternately desorbed from said adsorbent in an endothermic reaction and adsorbed on said adsorbent in an exothermic reaction;

said compounds having an ascending order of gaseous reactant vapor pressure wherein the adsorption temperature of a lower vapor pressure compound at adsorption pressure is at least 8° C. higher than the desorption temperature of the next successive higher vapor pressure compound at desorption pressure;

wherein said gaseous reactant comprises ammonia and said solid reactant is an inorganic salt selected from the group consisting of a metal oxide, halide, carbonate, oxalate, nitrate, nitrite, sulfide and sulfate, wherein said metal is selected from the group consisting of alkali metal, alkaline earth metal, transition metal, aluminum, zinc, cadmium and tin, or a double metal chloride of metals selected from the group consisting of an alkali metal, alkaline earth metal, aluminum, manganese, iron, nickel and cobalt;

means for introducing heat into at least one of said reactors, means for supplying a heat transfer fluid to and from said reactors, and means for directing the heat transfer fluid through said reactors in thermal communication with said compounds therein, whereby heat from an exothermic reaction is directed to a reactor for driving an endothermic reaction;

means for directing gaseous reactant to and from said reactors;

heat exchange means for heating and/or cooling said heat transfer fluid and for selectively recovering and/or adsorbing heat therefrom;

a single condenser and a single evaporator, conduit means for directing ammonia from each of said reactors to said condenser, and conduit means for directing ammonia from said evaporator to each of said reactors; and wherein the high vapor pressure compound comprises $CaCl_2 \cdot 4-8$ $(NH_3)$, $CaCl_2 \cdot 2-4(NH_3)$ or mixtures thereof or $SrCl_2 \cdot 1-8$ $(NH_3)$.

39. Apparatus of claim 38 wherein the low vapor pressure compound comprises $CaCl_2 \cdot 0-1$ $(NH_3)$, $CaCl_2 \cdot 1-2$ $(NH_3)$ or mixtures thereof, $CaBNr_2 \cdot 2-6$ $(NH_3)$, $FeCl_2 \cdot 2-6$ $(NH_3)$, or $CoCl_2 \cdot 2-6(NH_3)$.

40. An apparatus comprising:

a plurality of two or more reaction chambers, each of said chambers having a different compound therein comprising a solid reactant adsorbent and a gaseous reactant adsorbed thereon, each of said compounds having a different gaseous reactant vapor pressure, substantially independent of the concentration of the gaseous reactant therein;

said compounds having an ascending order of gaseous reactant vapor pressure and wherein the adsorption temperature of a lower vapor pressure compound at adsorption pressure is at least 8° C. higher than the desorption temperature of the next successive higher vapor pressure compound at desorption pressure;

wherein said gaseous reactant is selected from the group consisting of ammonia, water, carbon dioxide, sulfur dioxide, a lower alkanol, alkylamine, polyamine, phosphine and polar refrigerant having at least one free electron pair, and said solid reactant is an inorganic salt selected from the group consisting of a metal oxide, halide, carbonate, oxalate, nitrate, sulfide and sulfate, wherein said metal is selected from the group consisting of alkali metal, alkaline earth metal, transition metal, aluminum, zinc, cadmium and tin, or a double metal chloride of metals selected from the group consisting of an alkali metal, alkaline earth metal, aluminum, manganese, iron, nickel and cobalt, means for directing heat transfer fluid to an from said reaction chambers whereby heat from an exothermic adsorption reaction is directed to a reaction chamber for driving an endothermic desorption reaction, and heat exchange means for selectively recovering and/or absorbing heat from said reaction chambers;

condenser means comprising a single condenser and conduit means for directing gaseous reactant from each of said reaction chambers to said condenser, or two or more condensers, each operating at a different temperature;

evaporator means comprising a single evaporator and conduit means for directing gaseous reactant from said evaporator to each of said reaction chambers, or two or more evaporators, each operating at a different temperature; and wherein the highest vapor pressure compound is selected from the group consisting of:

$CaCl_2 \cdot 4-8$ $(NH_3)$, $CaCl_2 \cdot 2-4$ $(NH_3)$, and mixtures thereof, $SrCl_2 \cdot 1-8$ $(NH_3)$, $BaCl_2 \cdot 0-8$ $(NH_3)$, $LiCl \cdot 0-3$ $(NH_3)$, $SrBr_2 \cdot 2-8$ $(NH_3)$, $CaBr_2 \cdot 2-6$ $(NH_3)$, $FeCl_2 \cdot 2-6$ $(NH_3)$, $CoCl_2 \cdot 2-6$ $(NH_3)$, and $NaBF_4 \cdot 0.5-2.5$ $(NH_3)$, and $NaBr \cdot 0-5.25$ $(NH_3)$.

41. Apparatus of Claim 40, where one or more lower vapor pressure compounds are selected from the group consisting of:

$SrCl_2 \cdot 1-8$ $(NH_3)$, $CaCl_2 \cdot 2-4$ $(NH_3)$, $LiCl \cdot 0-3(NH_3)$, $SrBr_2 \cdot 2-8$ $(NH_3)$, $CaBr_2 \cdot 2-6$ $(NH_3)$, $FeCl_2 \cdot 2-6$ $(NH_3)$, $NiCl_2 \cdot 2-6$ $(NH_3)$, $CoCl_2 \cdot 2-6$ $(NH_3)$, $CoBr_2 \cdot 2-6$ $(NH_3)$, $CuSO_4 \cdot 2-4$ $(NH_3)$, and $CaCl_2 \cdot 0-1$ $(NH_3)$, $CaCl_2 \cdot 1-2$ $(NH_3)$ and mixtures thereof.

42. Apparatus of Claim 40, wherein the highest vapor pressure compound is selected from the group consisting of $CaCl_2 \cdot 4-8$ $(NH_3)$ and $CaCl_2 \cdot 2-4$ $(NH_3)$, a combination thereof, and $SrCl_2 \cdot 1-8$ $(NH_3)$.

43. Apparatus of Claim 42, wherein one of the lower stage vapor pressure compounds is $CaBr_2 \cdot 2-6$ $(NH_3)$.

44. Apparatus of Claim 42, wherein the lowest vapor pressure compound comprises $CaCl_2 \cdot 0-1$ $(NH_3)$, $CaCl_2 \cdot 1-2$ $(NH_3)$ or a combination thereof.

45. Apparatus of Claim 42, wherein the lowest vapor pressure compound is $NiCl_2 \cdot 2-6$ $(NH_3)$.

46. A mechanical or pressure actuated heat pump apparatus, comprising:

a plurality of two or more reaction chambers, each of said chambers having a different compound therein comprising a solid reactant adsorbent and a gaseous reactant adsorbed thereon, each of said compounds having a different gaseous reactant vapor pressure, substantially independent of the concentration of the gaseous reactant therein, said compounds having an ascending order of adsorption temperatures at the same adsorption and desorption pressure, respectively, and wherein the lower adsorption temperature compound adsorption temperature at high reaction pressure is at least 8° C. higher than the desorption temperature of the next successive higher adsorption temperature compound at low reaction pressure;

wherein said gaseous reactant is selected from the group consisting of ammonia, water, carbon dioxide, sulfur dioxide, lower alkanol, alkylamine, polyamine, phosphine and polar refrigerant having at least one free electron pair, and said solid reactant is an inorganic salt selected from the group consisting of a metal oxide, halide, carbonate, oxalate, nitrate, nitrite, sulfide and sulfate, wherein said metal is selected from the group consisting of alkali metal, alkaline earth metal, transition metal, aluminum, zinc, cadmium and tin, or a double metal chloride of metals selected from the group consisting of an alkali metal, alkaline earth metal, aluminum, manganese, iron, nickel and cobalt;

means for directing heat transfer fluid to and from said reaction chambers whereby heat from an exothermic adsorption reaction is directed to a reaction chamber for driving an endothermic desorption reaction; and wherein the lowest adsorption temperature compound is selected from the group consisting of:

$CaCl_2 \cdot 4-8$ $(NH_3)$, $CaCl_2 \cdot 2-4$ $(NH_3)$, mixtures thereof, $SrCl_2 \cdot 1-8$ $(NH_3)$, $BaCl_2 \cdot 0-8$ $(NH_3)$, $LiCl$ . 0–3 ($NH_3$), $SrBr_2$ . 2–8 ($NH_3$), $CaBr_2$ . 2–6 ($NH_3$), $FeCl_2$ . 2–6 ($NH_3$), $CaCl_2$ . 2–6 ($NH_3$), $NaBF_4$ . 0.5–2.5 ($NH_3$), and NaBr . 0–5.25 ($NH_3$).

47. Apparatus of claim 46, wherein the lowest adsorption temperature compound is selected from the group consisting of $CaCl_2$ . 4–8 ($NH_3$), $CaCl_2$ . 2–4 ($NH_3$), mixtures thereof, and $SrCl_2$ . 1–8 ($NH_3$).

48. Apparatus of claim 47, wherein one of the higher adsorption temperature compounds is $CaBr_2$ . 2–6 ($NH_3$).

49. Apparatus of claim 47, wherein the highest adsorption temperature compound comprises $CaCl_2$ . 0–1 ($NH_3$), $CaCl_2$ . 1–2 ($NH_3$) mixtures thereof, or $CaBr_2$ . 2–6 ($NH_3$).

50. An apparatus comprising:
 a plurality of three or more reactors each of said reactors having a different compound therein comprising a solid reactant adsorbent and a gaseous reactant adsorbed thereon, each of said compounds having a different gaseous reactant vapor pressure, substantially independent of the concentration of the gaseous reactant therein, and wherein said gaseous reactant is alternately desorbed from said adsorbent in an endothermic reaction and adsorbed on said adsorbent in an exothermic reaction;
 said compounds having an ascending order of gaseous reactant vapor pressure wherein the adsorption temperature of a lower vapor pressure compound at adsorption pressure is at least 8° C. higher than the desorption temperature of the next successive higher vapor pressure compound at desorption pressure;
 wherein said gaseous reactant is selected from the group consisting of ammonia, water, carbon dioxide, sulfur dioxide, lower alkanol, alkylamine, polyamine, phosphine and polar refrigerant having at least one free electron pair, and said solid reactant is an inorganic salt selected from the group consisting of a metal oxide, halide, carbonate, oxalate, nitrate, nitrite, sulfide and sulfate, wherein said metal is selected from the group consisting of alkali metal, alkaline earth metal, transition metal, aluminum, zinc, cadmium and tin, or a double metal chloride of metals selected from the group consisting of an alkali metal, alkaline earth metal, aluminum, manganese, iron, nickel and cobalt;
 means for introducing heat into at least one of said reactors, means for supplying a heat transfer fluid to and from said reactors, and means for directing the heat transfer fluid through said reactors in thermal communication with said compounds therein, whereby heat from an exothermic reaction is directed to a reactor for driving an endothermic reaction;
 means for directing gaseous reactant to and from said reactors;
 heat exchange means for heating and/or cooling said heat transfer liquid and for selectively recovering and/or adsorbing heat therefrom; and
 wherein said compound in at least one of said reactors comprises a calcium halide or a strontium halide.

51. A process for staging solid-vapor compound reactions, comprising:
 selecting a plurality of two or more different compounds comprising a solid reactant adsorbent and a gaseous reactant adsorbed thereon, wherein each of said compounds has a different gaseous reactant vapor pressure, substantially independent of the concentration of the gaseous reactant, wherein said gaseous reactant is selected from the group consisting of ammonia, water, carbon dioxide, sulfur dioxide, a lower alkanol, alkylamine, polyamine, phosphine and polar refrigerant having at least one free electron pair, and said solid reactant is an inorganic salt selected from the group consisting of a metal oxide, halide, carbonate, oxalate, nitrate, nitrite, sulfide, and sulfate, wherein said metal is selected from the group consisting of alkali metal, alkaline earth metal, transition metal, aluminum, zinc, cadmium, and tin, or a double metal chloride of metals selected from the group consisting of an alkali metal, alkaline earth metal, aluminum, manganese, iron, nickel and cobalt, and locating a different one of said compounds in a different one of a plurality of reactors;
 in a first reaction cycle, operating a first portion of said reactors at a température resulting in a first pressure, whereby said compound therein desorbs said gaseous reactant in an endothermic reaction, and operating said second portion of said reactors at a second pressure whereby said compound therein adsorbs said gaseous reactant in an exothermic reaction;
 in a second reaction cycle, operating said first portion of said reactors at said second pressure whereby said compound therein adsorbs said gaseous reactant in an exothermic reaction, and operating said second portion of said reactors at a temperature resulting in said first pressure whereby said compound therein desorbs said gaseous reactant in an endothermic reaction;
 directing at least a portion of the heat from an exothermic reaction to a reactor for driving an endothermic reaction;
 directing gaseous reactant released from said desorbing reactors to a condenser for said gaseous reactant, direction condensed gaseous reactant from said condenser to an evaporator for said gaseous reactant, and directing evaporated gaseous reactant from said evaporator to adsorbing reactors; and
 directing a first flow of said gaseous reactant from the desorbing reactor to said condenser and concurrently directing a second flow of gaseous reactant from said evaporator to the adsorbing reactor through a heat exchanger and exchanging heat between said first and second flows.

52. A process for staging solid-vapor compounds, comprising:
 selecting a plurality of two or more different compounds comprising a solid reactant adsorbent and a gaseous reactant adsorbed thereon, wherein each of said compounds has a different gaseous reactant vapor pressure, substantially independent of the concentration of the gaseous reactant, wherein said gaseous reactant is selected from the group consisting of ammonia, water, carbon dioxide, sulfur dioxide, a lower alkanol, alkylamine, polyamine, phosphine and polar refrigerant having at least one free electron pair, and said solid reactant is an inorganic salt selected from the group consisting of a metal oxide, halide, carbonate, oxalate, nitrate, nitrite, sulfide, and sulfate, wherein said metal is selected from the group consisting of alkali metal, alkaline earth metal, transition metal, aluminum, zinc, cadmium, and tin, or a double metal chloride of metals selected from the group consisting of an alkali metal, alkaline earth metal, aluminum, manganese, iron, nickel and cobalt, and locating a different one of said compounds in a different one of a plurality of reactors;

in a first reaction cycle, operating a first portion of said reactors at a temperature resulting in a first pressure, whereby said compound therein desorbs said gaseous reactant in an endothermic reaction, and operating said second portion of said reactors at a second pressure whereby said compound therein adsorbs said gaseous reactant in an exothermic reaction;

in a second reaction cycle, operating said first portion of said reactors at said second pressure whereby said compound therein adsorbs said gaseous reactant in an exothermic reaction, and operating said second portion of said reactors at a temperature resulting in said first pressure whereby said compound therein desorbs said gaseous reactant in an endothermic reaction;

directing at least a portion of the heat from an exothermic reaction to a reaction for driving an endothermic reaction;

directing gaseous reactant released from said desorbing reactors receiving means for said gaseous reactant, and directing gaseous reactant from receiving means to adsorbing reactors; and directing a first flow of said gaseous reactant from the desorbing reactor to a receiving mean and concurrently directing a second flow of gaseous reactant from receiving means to the adsorbing reactor through a heat exchanger and exchanging heat between said first and second flow.

53. A process for staging solid-vapor compounds, comprising:

selecting a plurality of to or more different compounds comprising a solid reactant adsorbent and a gaseous reactant adsorbed thereon, wherein each of said compounds has a different gaseous reactant vapor pressure, substantially independent of the concentration of the gaseous reactant, wherein said gaseous reactant is selected from the group consisting of ammonia, water, carbon dioxide, sulfur dioxide, a lower alkanol, alkylamine, polyamine, phosphine and polar refrigerant having at least one free electron pair, and said solid reactant is an inorganic salt selected from the group consisting of a metal oxide, halide, carbonate, oxalate, nitrate, nitrite, sulfide, and sulfate, wherein said metal is selected from the group consisting of alkali metal, alkaline earth metal, transition metal, aluminum, zinc, cadmium, and tin, or a double metal chloride of metals selected from the group consisting of an alkali metal, alkaline earth metal, aluminum, manganese, iron, nickel and cobalt, and locating a different one of said compounds in a different one of a plurality of reactors;

in a first reaction cycle, operating a first portion of said reactors at a temperature resulting in a first pressure, whereby said compound therein desorbs said gaseous reactant in an endothermic reaction, and operating said second portion of said reactors at a second pressure whereby said compound therein adsorbs said gaseous reactant in an exothermic reaction;

in a second reaction cycle, operating said first portion of said reactors at said second pressure whereby said compound therein adsorbs said gaseous reactant in an exothermic reaction, and operating said second portion of said reactors at a temperature resulting in said first pressure whereby said compound therein desorbs said gaseous reactant in an endothermic reaction;

directing at least a portion of the heat from an exothermic reaction to a reactor for driving an endothermic reaction;

directing gaseous reactant released from said desorbing reactors to condense for said gaseous reactant, directing condensed gaseous reactant from said condense to an evaporator for said gaseous reactant, and directing evaporated gaseous reactant from said evaporator to adsorbing reactors; and directing a liquid flow of condensed gaseous reactant from said condenser to said evaporator and concurrently directing a gaseous flow of gaseous reactant from said evaporator to said adsorbing reactor through a heat exchanger and exchanging heat between said liquid flow and said gaseous flow.

* * * * *

UNITED STATES PATENT AND TRADEMARK OFFICE
CERTIFICATE OF CORRECTION

PATENT NO. : 5,263,330

DATED : November 23, 1993

INVENTOR(S) : Uwe Rockenfeller, Lance D. Kirol

It is certified that error appears in the above-identified patent and that said Letters Patent is hereby corrected as shown below:

Please delete FIG. 3 and substitute the drawing below.

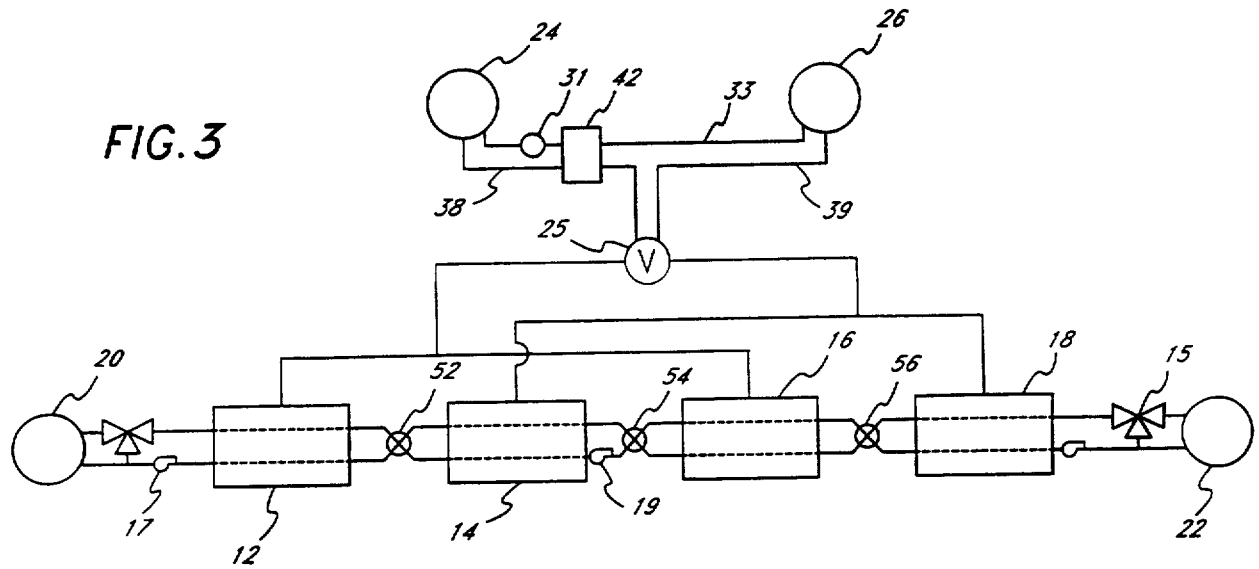

Signed and Sealed this

Eighth Day of April, 1997

Attest:

BRUCE LEHMAN

Attesting Officer       Commissioner of Patents and Trademarks